United States Patent
Jakob et al.

[11] Patent Number: 5,841,363
[45] Date of Patent: Nov. 24, 1998

[54] LOCKING SYSTEM ESPECIALLY FOR AUTOMOBILES

[75] Inventors: Marquardt Jakob, Rietheim-Weilheim; Karl Mueller, Rottweil-Neufra, both of Germany

[73] Assignee: Marquardt GmbH, Rietheim-Weilheim, Germany

[21] Appl. No.: 624,413

[22] PCT Filed: Sep. 29, 1994

[86] PCT No.: PCT/DE94/01131

§ 371 Date: Mar. 29, 1996

§ 102(e) Date: Mar. 29, 1996

[87] PCT Pub. No.: WO95/09746

PCT Pub. Date: Apr. 13, 1995

[30] Foreign Application Priority Data

Oct. 1, 1993 [DE] Germany ............................ 43 33 505.5
Nov. 26, 1993 [DE] Germany .......................... 93 20 270 U

[51] Int. Cl.$^6$ ................................................... H06F 7/00
[52] U.S. Cl. ............................... 340/825.31; 340/825.34; 340/825.69; 340/825.72; 70/278; 180/287; 361/171; 361/172
[58] Field of Search ........................ 340/825.31, 825.34, 340/825.69, 825.72; 307/10.2, 10.5, 10.3, 9.1; 70/278, 277; 361/171, 172; 180/287

[56] References Cited

U.S. PATENT DOCUMENTS

| | | | |
|---|---|---|---|
| 3,941,957 | 3/1976 | Tilman | 200/82 R |
| 4,111,007 | 9/1978 | Yokoyama | 66/125 R |
| 4,647,734 | 3/1987 | Dana | 200/43.06 |
| 4,868,405 | 9/1989 | Nakamura | 348/308 |
| 4,965,460 | 10/1990 | Tanaka et al. | 307/10.2 |
| 5,491,470 | 2/1996 | Veligdan | 340/825.31 |
| 5,504,478 | 4/1996 | Knapp | 340/825.69 |
| 5,596,317 | 1/1997 | Brinkmeyer et al. | 340/825.31 |

FOREIGN PATENT DOCUMENTS

| | | |
|---|---|---|
| 386449 | 8/1988 | Austria . |
| 0081765B1 | 6/1983 | European Pat. Off. . |
| 0138090B1 | 9/1984 | European Pat. Off. . |
| 0140137B1 | 9/1984 | European Pat. Off. . |
| 0266803 | 5/1985 | European Pat. Off. . |
| 0254424B1 | 6/1987 | European Pat. Off. . |

(List continued on next page.)

OTHER PUBLICATIONS

Zuttrittskontrolle: Damit Sie Wissen wer wann wo welche Türen Benutzt (hat), Baubeschlag–Magazine, 1989, pp. 190–191.

So Wissen Sie, wer wann wo Zutritt hatte; Baubeschlag–Magazine, 1989, p. 91.

Beil, Falk et al.; Eine bitserielle Universal–Schnittstelle nicht nur für Kfz–Anwendungen; Bus–Systeme, Elektronik, 4/17.2.1989.

Naegele, Tobias et al., The Next Big Auto Market: The Multiiplexed Data Bus; Electronics, Aug. 21, 1986 pp. 81–82.

"Here Comes A Better Way to Wire Up an Auto"; Electronics, Aug. 21, 1986; pp. 67–69.

Primary Examiner—Michael Horabik
Assistant Examiner—Yonel Beaulieu
Attorney, Agent, or Firm—Spencer & Frank

[57] ABSTRACT

A locking system for an automobile, comprises an operating key, an operating key receptacle and an associated operating unit. The operating key and the operating key receptacle have first means for transmitting a first coded operating signal from the operating key to the operating key receptacle. In addition, further second means are arranged in the operating key and in the operating key receptacle, for transmitting a second coded operating signal from the operating key receptacle to the operating key. The second operating signal cooperates with the first operating signal in a bidirectional communication in the manner of an alternating code, activation of the operating unit being made possible in the event of successful deciphering of the first transmitted operating signal.

16 Claims, 5 Drawing Sheets

FOREIGN PATENT DOCUMENTS

| | | |
|---|---|---|
| 0257212 | 6/1987 | European Pat. Off. |
| 0154019 | 7/1988 | European Pat. Off. |
| 0307749 | 3/1989 | European Pat. Off. |
| 0312123A1 | 4/1989 | European Pat. Off. |
| 0385070B1 | 1/1990 | European Pat. Off. |
| 0378945A1 | 7/1990 | European Pat. Off. |
| 0215291B1 | 2/1991 | European Pat. Off. |
| 0506084A1 | 9/1992 | European Pat. Off. |
| 0444412B1 | 12/1994 | European Pat. Off. |
| 2544782B1 | 4/1986 | France |
| 2674895 | 10/1992 | France |
| 2920885 | 12/1979 | Germany |
| 3313609A1 | 10/1983 | Germany |
| 3225754 | 1/1984 | Germany |
| 3313092C2 | 4/1986 | Germany |
| 3536377A1 | 4/1987 | Germany |
| 3820248A1 | 1/1989 | Germany |
| 3702331C2 | 4/1989 | Germany |
| 3828794A1 | 6/1989 | Germany |
| 8906580.8 | 8/1989 | Germany |
| 2911160C2 | 9/1989 | Germany |
| 3436761C2 | 12/1989 | Germany |
| 3917575A1 | 12/1989 | Germany |
| 3836026C2 | of 1990 | Germany |
| 3842790C1 | 4/1990 | Germany |
| 3840857A1 | 6/1990 | Germany |
| 4006125C1 | 3/1991 | Germany |
| 4102020A1 | 8/1991 | Germany |
| 4025229A1 | 2/1992 | Germany |
| 3905651C2 | 4/1992 | Germany |
| 3941086C2 | 5/1992 | Germany |
| 3927024C2 | 9/1992 | Germany |
| 4123654A1 | 1/1993 | Germany |
| 9307176.0 | 9/1993 | Germany |
| 4111582C2 | 4/1994 | Germany |
| 3520932C2 | 6/1994 | Germany |
| 4102816C2 | 6/1994 | Germany |
| 4226053C2 | 12/1994 | Germany |
| 3643646C2 | 6/1995 | Germany |
| 2051442B | 2/1984 | United Kingdom |
| 2174452 | 11/1986 | United Kingdom |
| 2265482 | 7/1995 | United Kingdom |
| WO89/02141 | 3/1989 | WIPO |

LOCKING SYSTEM ESPECIALLY FOR AUTOMOBILES

BACKGROUND OF THE INVENTION

The invention relates to a locking system, particularly for an automobile, including an operating key, an operating key receptacle, an operating unit and means for transmitting coded operating signals located in the operating key and the operating key receptacle for activating the operating unit upon a successful deciphering of the coded operating signals.

Locking systems of this type serve as a safety measure against the unauthorized operation of devices equipped with them. When the locking system is actuated by a user, the authorization of the latter is checked and only the presence of the correct authorization affords the precondition for the intended use of the device. In particular on automobiles, such locking systems are employed as an ignition lock for an associated operating unit and/or for locking and unlocking the doors.

German Offenlungsschrift 3,436,761 discloses a locking system for an automobile which comprises an operating key, an operating key receptacle and connecting lines from an associated operating unit. An operating signal transmitter having an operating signal encoder is arranged in the operating key and an operating signal receiver having an operating signal decoder is arranged in the operating key receptacle. A coded operating signal can be transmitted from the operating signal transmitter to the operating signal receiver, the activation of the operating unit being carried out after the successful decoding of this operating signal in the operating signal decoder.

It has emerged that a locking system of this type is not theft-proof. By listening to and/or copying the operating signal transmitted by the operating key, it is possible to make a substitute key. By means of this substitute key, activation of the operating unit and consequently theft of the automobile are then possible.

In order to function, the operating key requires an energy source, which may be exhausted after a particular period of service. In such an instance, the operating key is no longer operational. Activation of the operating unit then cannot take place.

FR-A-2 674 895 describes a locking system for the doors of an automobile which operates by means of radio waves for data transmission. Located in the door of the automobile is a first transmitter/receiver with an antenna. Located in the grip of an associated key is an antenna with a second transmitter/receiver. A first code is transmitted from the first transmitter to the second receiver in the key. Energy is obtained from this signal for supplying the key and the first code is evaluated. Subsequently, a second code is transmitted from the second transmitter to the first receiver in the door of the automobile and is evaluated there. In the case of positive evaluation, the central locking system in the door of the automobile is actuated.

In the case of this locking system, there in turn takes place a bidirectional code transmission with simultaneous transmission of energy to the key for its operation. The range of problems already mentioned also occur here. Further locking or security systems which operate by means of a bidirectional data transmission for exchanging the codes are described in GB-A-2 051 442 and DE-U-93 07 176. However, a transmission of energy for the operation of the key is not shown there.

EP-A-0 307 749 in turn discloses a data transmission device which can be used as a locking system, having two optical transmitting/receiving units, in which device data are bidirectionally transmitted optically. After successful dialogue of the data transmission, the locking system is actuated. In the first transmitting/receiving unit there is additionally arranged a light transmitter for the transmission of light energy and in the second transmitting/receiving unit there is arranged a light receiver for converting the light energy into electrical energy. There is further located in the second transmitting/receiving unit a store for the electrical energy, for example a capacitor, so that the second transmitting/receiving unit is supplied with power by this transmitted energy. The light energy is transmitted in the transmitting breaks of the data transmission.

In the case of this locking system, the problem is that reliable operation is not possible when there is simultaneous transmission of energy and data. The difficulties in the case of a system according to the prior art lie here in the fact that, when there is simultaneous transmission, an adequate level of energy emission can disturb the data transmission. Therefore, the data transmission is carried out at a separate time from the energy transmission, which increases the overall length of time of the transmissions. As a result, the risk of operating errors, and consequently of adverse effects on the anti-theft security, is increased.

SUMMARY OF THE INVENTION

The object on which the invention is based is to specify a locking system of the type mentioned, especially for an automobile, having improved theft protection and functional reliability.

This problem is achieved according to the invention by the provision of a locking system for an automobile, comprising: an operating key; an operating key receptacle; an operating unit associated with the operating key receptacle; a light guide in the operating key receptacle; and electrooptical converter elements, including luminous elements and photocells arranged in the operating key and in the operating key receptacle optically coupled to the light guide, for transmitting an optical energy signal through the light guide from the operating key receptacle to the operating key for supplying energy for operation of the operating key, and for transmitting coded operating signals through the light guide, including a second operating signal transmitted from the operating key receptacle to the operating key and a first operating signal transmitted from the operating key to the operating key receptacle, wherein the second operating signal operates jointly with the first operating signal in a bidirectional communication to constitute an alternating code for activation of the operating unit upon a successful decoding of the two transmitted operating signals. according to the invention is distinguished by the fact that the signal transmission takes place via a light guide arranged in the operating key receptacle and/or the energy transmission takes place via a light guide arranged in the operating key receptacle, and that the corresponding electrooptical converter elements located in the operating key receptacle are optically connected to the light guide or the light guides.

According to a further aspect of the invention, the locking system can be designed not only as an ignition lock for activating engine electronics, an immobilizer or the like, but also for reliable remote control of the central locking system on the automobile. Furthermore, the locking system can be connected via a bus node to a bus system located in the automobile. The locking system is based on an, if appropriate, wireless transmission of coded operating signals.

Moreover, energy transmission from the operating key receptacle to the operating key takes place, optical energy transmission being carried out for this purpose. This transmitted energy serves for the intended operation of the operating key. As a result, an additional energy store in the operating key is no longer necessary for the operation of the latter. In the case of optical energy and signal transmission, it is possible to arrange in the operating key receptacle a light guide rod which is designed for the simultaneous transmission of energy and signals. If the operating key receptacle of the locking system is designed as an ignition lock, the operating key receptacle can be designed in such a way that the actual activation of the operating unit takes place in the usual way as a result of rotation by means of the operating key.

The advantages achieved by the invention are, in particular, that a further improvement in theft protection is obtained. It is not possible to listen to the operating key via a minitransmitter. The operating key therefore cannot, in practice, be copied, with the result that activation of the operating unit is impossible for unauthorized parties.

The operating key is largely maintenance-free. The supply of energy to the operating key takes place by means of the operating key receptacle. Even when the energy store in the operating key is in fact exhausted, an intended use of the operating key is still possible. Thus, a duplicate key can be designed, even entirely without an energy store, for activating the operating unit with the same degree of security. The locking system can also be produced merely as a partial refinement without remotely controllable door opening, the same degree of starting security being provided, in which case there is no need for the operating key to have its own energy store.

The operating key receptacle can be of a very simple mechanical design, so that the locking system according to the invention, whilst having increased theft protection, can be produced at markedly lower costs than conventional mechanical locking systems. Furthermore, the operating key receptacle can be integrated in a simple way into a bus system. This advantageously results in a low outlay in terms of cabling, along with high operating reliability.

BRIEF DESCRIPTION OF THE INVENTION

Exemplary embodiments of the invention are represented in the drawings and are described in more detail below. In the drawings:

FIG. 1 shows schematically a functional overview of the locking system in an automobile, FIGS. 2a and 2b show block diagrams of alternative embodiments of electronics for the locking system, FIG. 3 shows a longitudinal section through an operating key, and FIG. 4 shows a longitudinal section through an operating key receptacle.

DETAILED DESCRIPTION OF THE INVENTION

Figure 1:
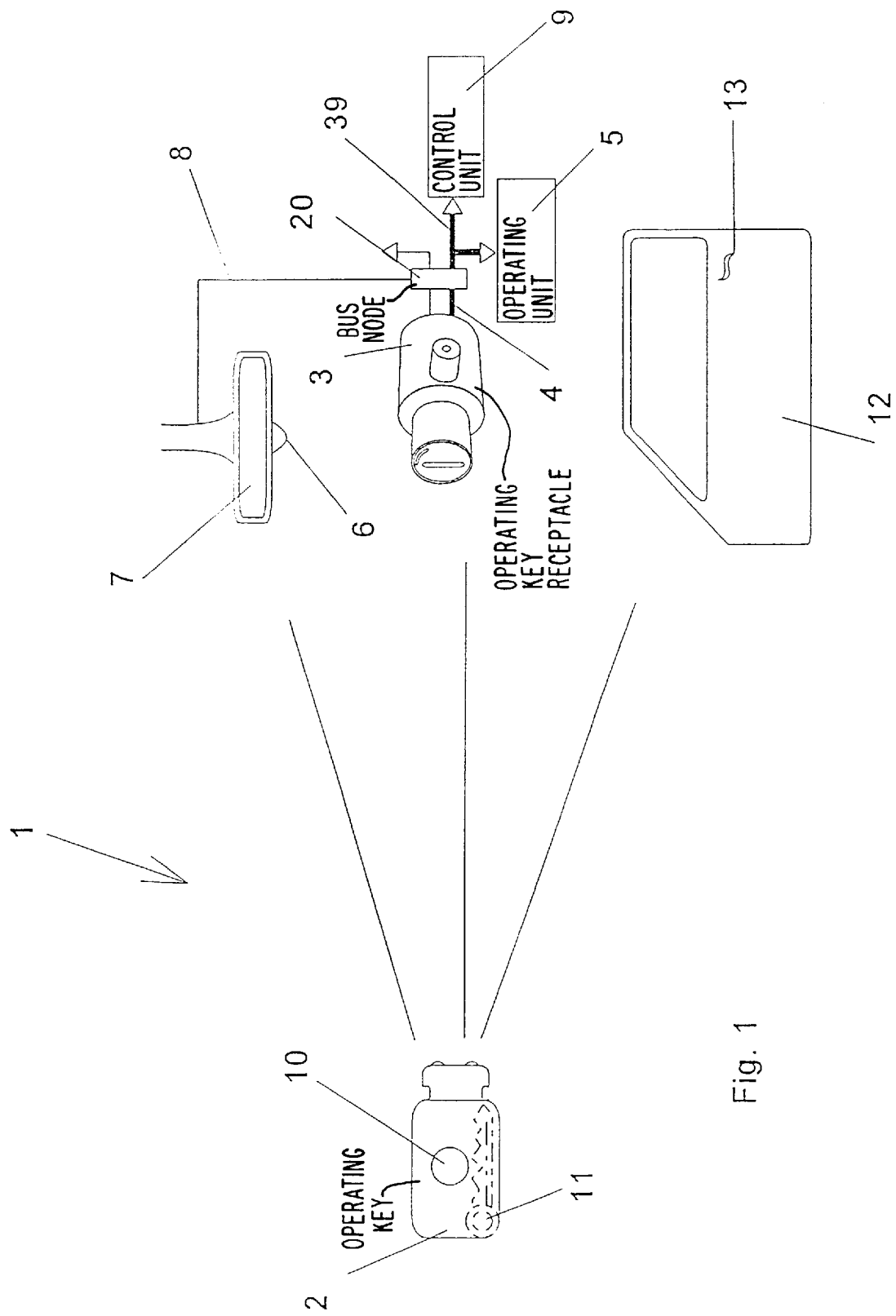

The locking system 1 shown in FIG. 1 is intended for an automobile and comprises an operating key 2, of an operating key receptacle 3 designed as an ignition lock and connecting lines 4 to a bus node 20. Bus lines 39 lead further from the bus node 20 to an associated operating unit 5. The operating unit 5 may be, for example, the electronic engine control of the automobile, an immobilizer or the like. By means of the operating key 2 inserted into the operating key receptacle 3, the operating unit 5 can be activated by means of corresponding bus signals transmitted via the bus lines 39.

The bus system comprising the bus node 20 and the bus lines 39 may be, for example, the CAN bus known from automobile electronics, such as is described by way of example in the literature reference Philips: CAN Products for universal fields of use, January 1992. A different bus system can, of course, also be used equally well.

In the present case, the operating key 2 of the locking system 1 serves at the same time for the remotely controllable actuation of the central locking system for the doors 12 of the automobile. The remote control is supplied by an energy store 38 (see FIG. 3) located in the operating key 2. Arranged in the automobile is a sensor which corresponds to the remote control in the operating key 2 and which is designed, for example, as a roof sensor 6 having a reception range of approximately 360°. This roof sensor 6 is attached to the interior mirror 7. The roof sensor 6, working in pulsed mode to minimize current, is connected to the bus node 20 via connecting lines 8. When the roof sensor 6 receives signals from the operating key 2, these bring about their processing by means of an alerting circuit located in the bus node 20. Corresponding bus signals are then transmitted via the bus lines 39 to the control unit 9 for the central locking system. Thus, by pressing a button 10 on the operating key 2, the central locking system can be actuated for the locking and unlocking of the doors 12 of the automobile.

The locking system 1 can advantageously serve at the same time for locking and unlocking the alarm system. In that case, the functions of the alarm system are controlled according to the control in the operating key receptacle 3. Furthermore, a logic unit for determining the voltage of the energy store 38 in the operating key 2 can be arranged in the operating key receptacle 3, so that an intrusion by opening a door 12 of the automobile is detected.

The operating key 2 has, furthermore, a swing-out mechanical key 11. Arranged on the driver's side automobile door 12 is conventional mechanical door lock 13 which can be unlocked by means of the mechanical key 11. An emergency opening of the automobile in the event of failure of the central locking system, for example if the energy store 38 in the operating key 2 is empty, is thereby possible.

According to a further embodiment, the locking system 1 can also be produced merely as a partial refinement, dispensing with remotely controllable actuation of the central locking system. In this embodiment, the locking and unlocking of the automobile doors 12 takes place in a conventional way by means of a mechanical key 11. The operating unit 5 is activated in the inventive way according to bidirectional communication, which is explained in more detail later, by means of the operating key 2 inserted in the operating key receptacle 3. In this partial refinement, at least the costs of the roof sensor 6 can be saved, at the expense of less convenient operation.

The design of the operating key receptacle 3 as an ignition lock, as shown in FIG. 1, is in fact preferred, but the operating key receptacle can also be designed as some other device on the automobile which can be controlled by means of the operating key 2. Thus, the operating key receptacle can also be designed as a signal processing device, located on the automobile, for the central locking system, which can be remotely controllable by means of the operating key 2, and the operating unit can be designed as a central locking system for unlocking and locking the automobile doors 12. In this case, after successful bidirectional transmission of the operating signals in the manner of an alternating code between the operating key 2 and the signal processing device, the central locking system is actuated by the signal processing device for the locking or unlocking of the automobile doors 12. The bidirectional transmission of the operating signals is explained in more detail below.

Figure 2A:
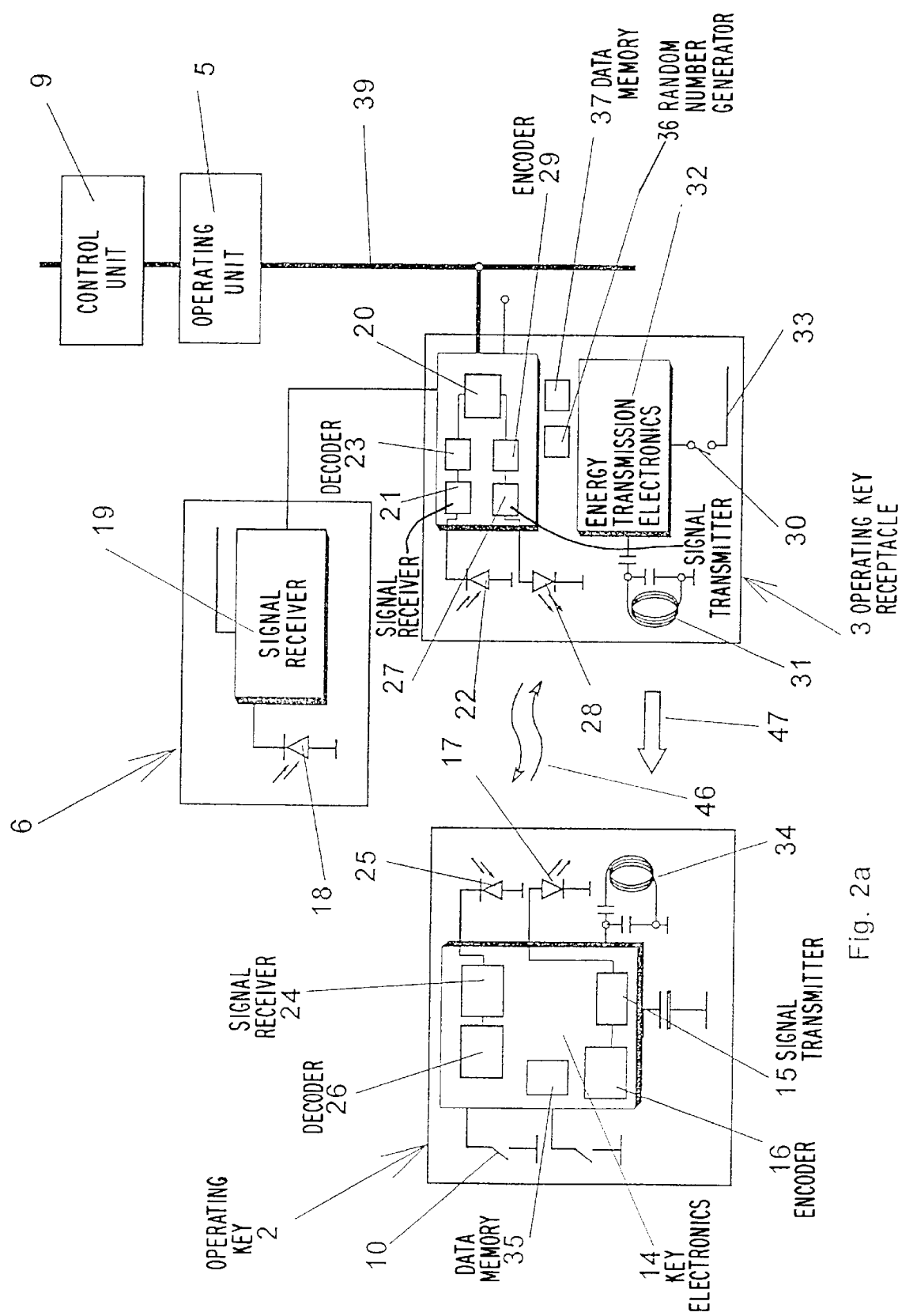
Figure 2B:
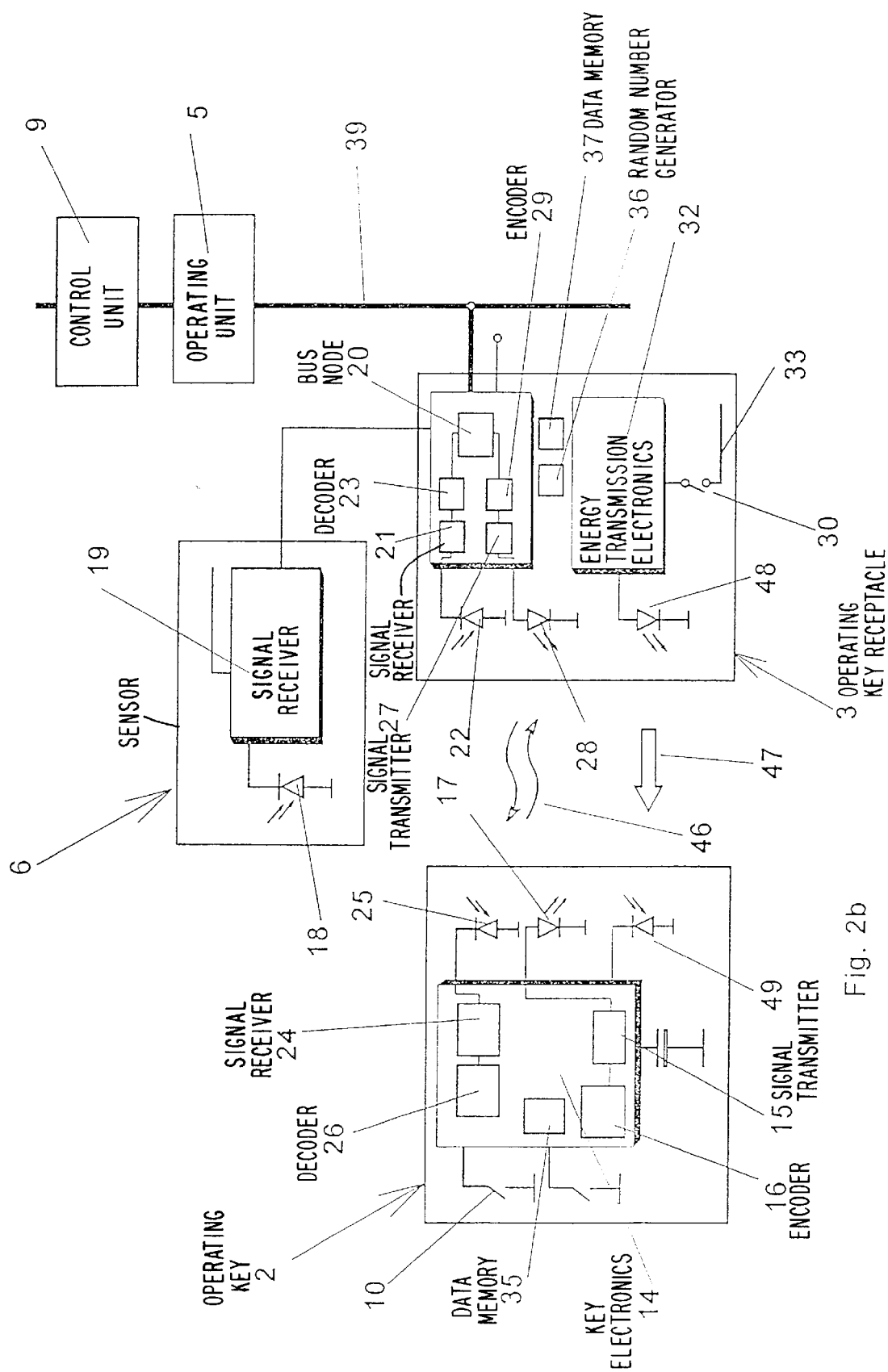

The more detailed design of the electronics of the central locking system 1 is shown in the block diagrams of FIGS. 2a and 2b in which common elements have the same reference numerals. The operating key 2 has key electronics 14 comprising an integrated circuit. These key electronics 14 contain a first operating signal transmitter 15, which can be designed as an infrared transmitter having an infrared transmitting diode 17. The key electronics 14 contain furthermore a first operating signal encoder 16, which is connected in turn to the first operating signal transmitter 15. The operating key receptacle 3 has a first operating signal receiver 21, designed as an infrared receiver, with an associated infrared receiving diode 22, and a first operating signal decoder 23, connected to the first operating signal receiver 21. A first coded operating signal can thereby be transmitted from the first operating signal transmitter 15 of the operating key 2 to the first operating signal receiver 21 in the operating key receptacle 3. Furthermore, in each case, a second operating signal receiver 24, designed as an infrared receiver, with an associated infrared receiving diode 25, and a second operating signal decoder 26, connected thereto, are arranged in the operating key 2 and a second operating signal transmitter 27, designed as an infrared transmitter, with an associated infrared transmitting diode 22, and a second operating signal encoder 29, connected thereto, are arranged in the operating key receptacle 3. As a result, once again, a second coded operating signal can be transmitted from the second operating signal transmitter 27 in the operating key receptacle 3 to the second operating signal receiver 24 in the operating key 2. The transmission medium for the infrared signals serving as operating signals can comprise air, but a light guide arranged in the operating key receptacle 3 is preferably used for this purpose. To activate the operating unit 5, the second operating signal cooperates with the first operating signal in a bidirectional communication 46 in the manner of an alternating code.

The function of the already mentioned remote control of the central locking system is also performed by the first operating signal transmitter 15, in that, when the button 10 is actuated, said transmitter transmits a code, enciphered by the first operating signal encoder 16, as a third operating signal via the infrared transmitting diode 17. One or more infrared receiving diodes 18 having a connected third operating signal receiver 19 are located in the roof sensor 6. The third operating signal is fed via the connecting lines 8 to the bus node 20 for evaluation and further processing.

In FIG. 2A, it can be seen, as a further embodiment, that the bus node 20 can advantageously be arranged in the operating key receptacle 3. The roof sensor 6 is, in that case, connected to the bus node 20 via the operating key receptacle 3. The first operating signal decoder 23 can be a separate circuit in the operating key receptacle 3, the code, deciphered by the first operating signal decoder 23, being transmitted as a binary signal to the bus node 20. It is also possible, however, to integrate the function of the operating signal decoder into the bus node 20, so that the operating signal received by the first operating signal receiver 21 is transmitted directly as a coded signal to the bus node 20. Alternatively, it is possible, furthermore, to transmit the received infrared signals by means of a light guide to the bus node 20 and only there convert them into electrical signals for further processing.

As soon as the operating key 2 is inserted into the operating key receptacle 3, a switch 30 in the operating key receptacle 3 is actuated by the operating key 2. By means of the switch 30, an optical energy transmission 47 between the operating key receptacle 3 and the operating key 2 is then switched on. The key electronics 14 are consequently then supplied with energy by the operating key receptacle 3, so that an energy store 38 present in the operating key 2 is required only during the actuation of the remote control for central locking, which takes place outside the operating key receptacle 3. As a result, the energy store 38 (FIG. 5) has a very long service life, so that it is very seldom necessary to exchange the energy store 38. If, instead of a battery, an accumulator is used for the energy store 38, this can be recharged, even while the operating key 2 is located in the operating key receptacle 3, thereby making it unnecessary to exchange the energy store 38.

To increase the operating reliability, the optical energy transmission 47 takes place, as shown in FIG. 2a, by means of light beams, as or infrared beams is particularly preferred, as shown in FIG. 2b in a further embodiment of the locking system. When the switch 30 is actuated by the operating key 2 inserted into the operating key receptacle 3, the energy transmission electronics 32, again supplied by the on-board power supply feed line 33, supplies a luminous element 48 which emits, for example, infrared beams. These infrared beams are transmitted to a corresponding photocell 49 in the operating key 2, specifically, as is particularly preferred, via a light guide. In this photocell 49, the infrared beams are then converted again into an electric voltage. The energy transmitted optically by means of the electrooptical convertor elements, namely the luminous element 48 and the photocell 49, serves once again for operating the key electronics 14.

As can be further inferred from FIG. 2A, the key electronics 14 contain a data memory 35 which may be, for example, an EEPROM memory. A unique identification for the respective automobile is filed as an individual identification in this data memory 35. This individual identification may be, for example, a unique number issued by the automobile manufacturer. The same individual identification is likewise stored in a data memory 37 in the operating key receptacle 3. The operating signal encoders 16, 29 and operating signal decoders 23, 26 work according to a fixed algorithm. The algorithm can, if appropriate, be filed in the data memory 35, 37 or else be obtained by means of a corresponding electronic circuit. Furthermore, a random number generator 36 is also located in the operating key receptacle 3.

To activate the operating unit 5, after the operating key 2 is inserted into the operating key receptacle 3 and the energy transmission 47 is switched on, a once-only identifying of the individual identification is carried out by means of the bidirectional communication 46 between the two operating signals in the manner of an alternating code. This bidirectional communication 46 works in detail as follows.

First of all, a random number is determined as an identification number by means of the random number generator 36 and is stored in the data memory 37 of the operating key receptacle 3. A code is formed from this identification number in the second operating signal encoder 29 of the operating key receptacle 3 by means of the fixed algorithm and is transmitted as the second operating signal to the operating key 2 by means of the second operating signal transmitter 27. This second operating signal, received by the operating key 2 by means of the second operating signal receiver 24, is deciphered into a transmitted identification number by means of the second operating signal decoder 26 with the aid of the algorithm. After deciphering has taken place, the transmitted identification number and the individual identification stored in the data memory 35 of the operating key 2 are then used to form a first operating signal in the first operating signal encoder 16 of the operating key 2 with the aid of the fixed algorithm. At the same time, the transmitted identification number is stored in the data memory 35. If, in the expanded refinement stage, the operating key 2 has remote control for door opening, an additional counter, which counts the number of door openings, is set to zero, and this count is stored in the data memory 35. The first operating signal is subsequently transmitted to the first operating signal receiver 21 in the operating key receptacle 3. Thereafter, the first operating signal is deciphered in the first operating signal decoder 23 of the operating key receptacle 3 according to the fixed algorithm, thus resulting in a determined identification number and a determined individual identification. A comparison of the determined individual identification and determined identification number with the individual identification and identification number stored in the data memory 37 is subsequently carried out. If this comparison has a positive result, that is to say if the individual identification and identification number are correct, the activation of the operating unit 5 is cleared by the operating key receptacle 3 via the bus node 20, otherwise activation cannot take place. The count for the door opening filed in the data memory 37, if present according to the expanded refinement stage, is likewise set to zero if there is a positive comparison in terms of individual identification and identification number.

To ensure less complication, for the remote control of the central locking system there is only unidirectional signal transmission from the operating key 2 to the roof sensor 6, although, even there, a bidirectional communication which is secure in terms of theft protection is possible in a similar way to that between the operating key 2 and the operating key receptacle 3. The unidirectional signal transmission works in detail as follows.

When the button 10 is actuated, in the operating key 2 a third operating signal is formed from the individual identification stored in the data memory 35, the transmitted identification number, determined during the last activation in the random number generator 36 of the operating key receptacle 3, and a counter, incremented by one, which counts the number of door openings since the last activation of the automobile, by means of a fixed algorithm in the first operating signal encoder 16, and said third operating signal is transmitted. At the same time, the incremented count is filed in the data memory 35 of the operating key 2. The third operating signal received via the roof sensor 6 is transmitted to the bus node 20 in the operating key receptacle 3 and is deciphered there in a decoder, assigned to the roof sensor 6, by means of the identification number stored in the data memory 37 and by means of the fixed algorithm. This decoder can be the first operating signal decoder 23 already located in the operating key receptacle 3. The result of the deciphering gives a determined individual identification and a determined count. The determined individual identification is compared with the individual identification stored in the memory 37 and, if they are identical, there is a further check as to whether the determined count is higher than or equal to the count for the number of door openings, the latter count being stored in the data memory 37 of the operating key receptacle 3. If this condition is likewise satisfied, unlocking or locking is triggered on the control unit 9 of the central locking system. At the same time, the count in the data memory 37 of the operating key receptacle 3 is replaced by the determined count.

A comparison of the count for the number of door openings in the operating key 2 with the count in the operating key receptacle 3 ensures that an unauthorized user can open the automobile only once by means of an operating key copied by listening to the transmitted third operating signal. As soon as the authorized user actuates the door opening a further time, the count changes, without activation of the automobile being necessary, and a further opening by means of the copied key is no longer possible. For a further increase in theft protection, the two algorithms for actuating the operating unit 5 and the control unit 9 for the central locking system can be different and/or changed at specific time intervals.

In a preferred embodiment of the invention, the transmission of the first and second operating signal in bidirectional communication and of the third operating signal in unidirectional communication takes place, as described, as an infrared signal.

After the activation of the operating unit 5 is cleared by the bus node 20, actuation for unlocking a steering wheel lock known per se, not shown in more detail, can be simultaneously triggered. The actuation of the steering wheel lock can take place by means of an electromagnet. The activation of the operating unit 5 is thereafter carried out via the bus node 20 by means of a further signal triggered by the user.

Figure 3:
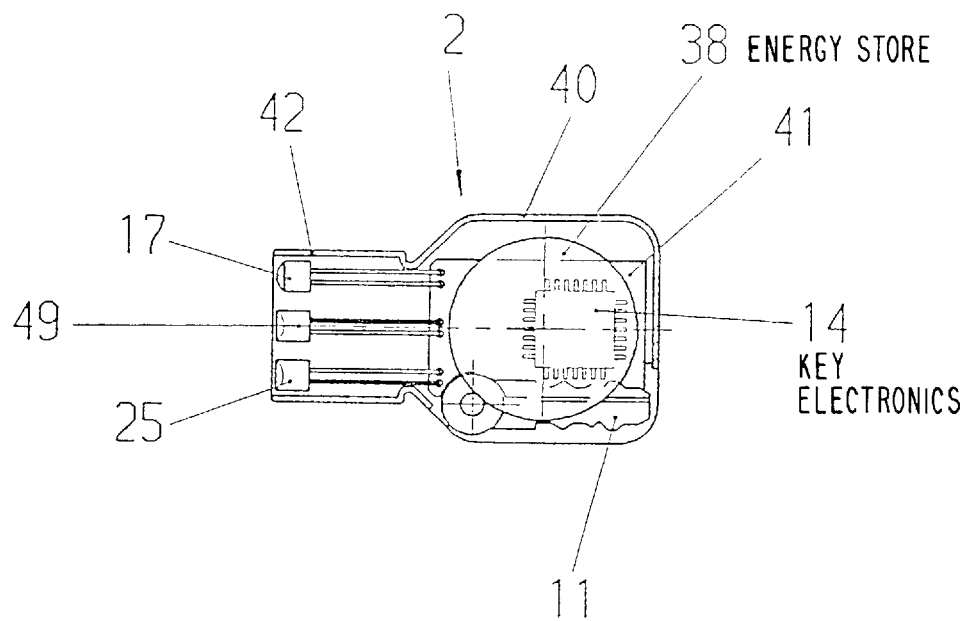
Figure 4:
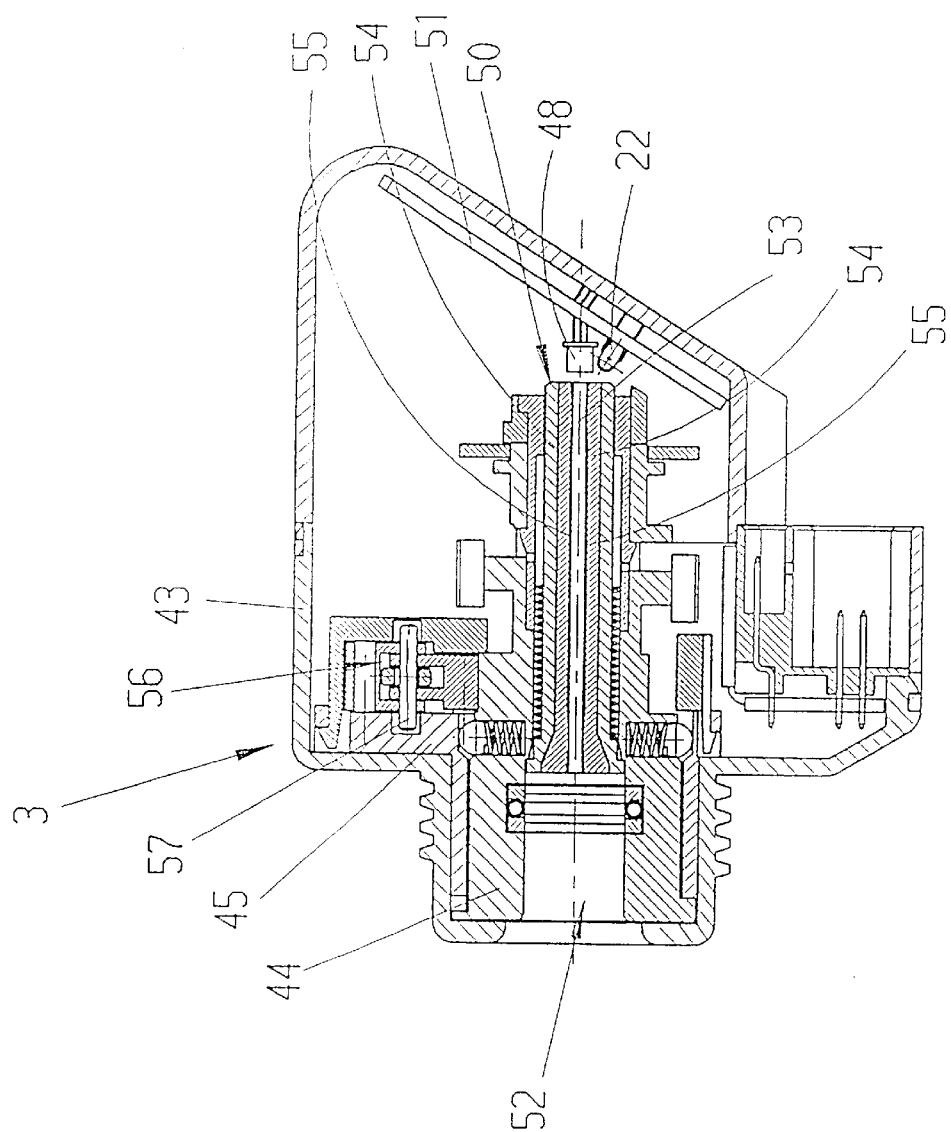

The more detailed design of the operating key 2 and of the operating key receptacle 3 can be seen in FIGS. 3 and 4. As shown in FIG. 3, the operating key 2 has a housing 40, the rear part of which contains a printed circuit board 41. The key electronics 14, designed as an integrated circuit, are located on the printed circuit board 41. The front part of the housing 40 is designed as a type of plug 42 for insertion into the operating key receptacle 3 and contains orifices, in which the infrared transmitting diode 17 of the first operating signal transmitter 15 and the infrared receiving diode 25 of the second operating signal receiver 24 are arranged with connection to the printed circuit board 41. Furthermore, the photocell 49 is also located in the plug. Finally, the housing 40 also contains the schematically indicated energy store 38 for the remote control of the central locking system.

As shown in FIG. 4, the operating key receptacle 3 comprises a housing 43 which terminates in a type of plug socket 44 for receiving the plug 42 on the operating key 2. The light guides serving for optical signal and energy transmission are designed as a common light guide rod 50, which is located in the housing 43. The light guide rod 50 comprises a light guide 53, located in the middle, for optical energy transmission 47 and a further light guide 54 for optical signal transmission, which annularly surrounds the middle light guide 53, so that the two light guides 53, 54 form a common solid rod. The two light guides 53, 54 are separated by a non-photoconductive layer 55 lying between them. One end of the light guide rod 50 is arranged in the immediate vicinity of the plug socket 44. The light guide rod 50 leads from the plug socket 44 as far as a printed circuit board 51 located in the housing 43 of the operating key receptacle 3, there being arranged at the second end of the light guide rod 50 the electrooptical convertor elements with optical connection to the light guide rod 50 on the printed circuit board 51, namely the infrared receiving diode 22 of the first operating signal receiver 21 and the infrared transmitting diode 28, not visible in FIG. 4, of the second operating signal transmitter 27 as well as the luminous element 48. When the operating key 2 is inserted into the operating key receptacle 3 at the orifice 52 of the plug socket 44, the electrooptical convertor elements in the operating key 2, namely the infrared transmitting diode 17, the infrared receiving diode 25 and the photocell 49, are optically connected to the first end of the light guide rod 50. Consequently, the infrared transmitting diode 17 of the operating key 2 and the infrared receiving diode 22 of the operating key receptacle 3 as well as the infrared receiving diode 25 of the operating key 2 and the infrared transmitting diode 28 of the operating key receptacle 3 are optically coupled via the light guide 54 of the light guide rod 50. Furthermore, optical coupling takes place by means of the light guide 53 of the light guide rod 50 between the luminous element 48 of the operating key receptacle 3 and the photocell 49 of the operating key 2 for energy transmission 47.

So that the actual activation is designed as the user is accustomed for the operation of starting the automobile by means of a conventional ignition lock, the plug socket 44 in the operating key receptacle 3 is preferably made rotatable. An elastically coupled rotary sleeve 45 in the operating key receptacle 3 is operatively connected to the plug socket 44. To initiate the activation after a successful transmission of the two operating signals according to the bidirectional communication 46, the rotary sleeve 45 is then first unlocked by moving a stop pin 57 of an electromagnetic blocking device 56 out of engagement with the rotary sleeve 45. The user can then, as in a conventional ignition lock 2 too, now rotate the operating key 2 together with the plug socket 44 and the rotary sleeve 45. In this case, switching signals are generated in specific rotary positions of the rotary sleeve 45 by means of a device. This device for generating the switching signals comprises mechanical, electronic, optical, optoelectronic or such like switching elements, not shown further, which are located in the housing 43 and which are actuated by the rotary sleeve 45. These switching signals are transmitted to the bus node 20 and bring about the clearance of the parking light, specific parts of the energy supply, for example for the automobile radio, etc. Finally, one of these switching signals serves for activating the operating unit 5, that is to say, for example, for starting the engine of the automobile.

In order to terminate the operation of the operating unit 5, the operating key 2, together with the plug socket 44 and the rotary sleeve 45, is rotated back again. In this case, the switching signals are changed by the device for generating switching signals, that is to say the corresponding switching elements are switched off again. The changed switching signals are transmitted via the bus node 20 for deactivating the operating unit 5. When the operating key 2 is withdrawn from the operating key receptacle 3, at the same time a locking of the steering wheel by means of a mechanical steering wheel lock can take place, and locking can be brought about by the switching signal of the switch 30.

The data memory 35 in the operating key 2 can also be utilized for further functions, for example for the storage of service data, user data and the like. In particular, permanent data transmission from the operating key receptacle 3 to the operating key 2 can take place while the automobile is traveling by means of the second operating signal transmitter 27 and the second operating signal receiver 24. Travel data can thereby be stored in the data memory 35 in the manner of an electronic logbook.

The invention is not restricted to the exemplary embodiments described and represented. On the contrary, it also embraces all developments within the scope of the inventive idea which are open to a person skilled in the art. Thus, a locking system of this type can not only be employed on automobiles, but also be used on doors, for example in building technology.

We claim:

1. A locking system for an automobile, comprising:

an operating key;

an operating key receptacle;

an operating unit associated with the operating key receptacle;

a light guide in the operating key receptacle; and electro-optical converter elements, including luminous elements and photocells arranged in the operating key and in the operating key receptacle, optically coupled to the light guide, for transmitting an optical energy signal through the light guide from the operating key receptacle to the operating key for supplying energy for operation of the operating key, and for transmitting coded operating signals through the light guide, including a second operating signal transmitted from the operating key receptacle to the operating key and a first operating signal transmitted from the operating key to the operating key receptacle, wherein the second operating signal operates jointly with the first operating signal in a bidirectional communication to constitute an alternating code for activation of the operating unit upon a successful decoding of the two transmitted operating signals.

2. The locking system according to claim 1, wherein the light guide comprises a common light guide including a first light guide for transmitting the optical energy signal and second light guide optically separated from the first light guide for transmitting the coded operating signals.

3. The locking system according to claim 2, wherein the second light guide annularly surrounds the first light guide and further including a non-photoconductive layer disposed between the first and second light guides.

4. The locking system according to claim 1, wherein the operating key and the operating key receptacle contain first and second data memories, respectively, each for storing an individual identification number comprising a unique number, the operating key receptacle includes a random number generator for generating a random number as the unique number and means for enciphering the code of the second operating signal with the random number as the identification number with the use of an algorithm; and the operating key includes means for enciphering the code of the first operating signal with the identification number also with the use of an algorithm.

5. The locking system according to claim 4, and further including: a sensor with a reception range of about 360° arranged on the automobile for controlling a central locking system for doors of the automobile; and a decoder assigned to the sensor; wherein the electro-optical converter elements in the operating key are for transmitting a third operating signal having an enciphered code and the operating key further includes a controllable switch for initiating a unidirectional transmission of the third operating signal which when sensed by the sensor and deciphered by the decoder assigned to the sensor, allows locking and unlocking of the central locking system.

6. The locking system according to claim 5, wherein the enciphered code of the third operating signal contains the identification number determined during a last activation of the operating unit and stored in the data memory of the operating key; and the operating key includes a counter and means for incrementing the counter by one each time the central locking system is actuated and storing the count in the data memory of the operating key, the enciphered code of the third operating signal additionally containing the stored count of the counter since the last activation of the central locking system.

7. The locking system according to claim 4, and further including: a sensor with a reception range of about 360° arranged on the automobile for controlling a central locking system for doors of the automobile; and a decoder assigned to the sensor; wherein the electro-optical converter elements in the operating key are for transmitting a third operating signal having an enciphered code and the operating key further includes a controllable switch for initiating a unidirectional transmission of the third operating signal which when sensed by the sensor and deciphered by the decoder assigned to the sensor, allows locking and unlocking of the central locking system; the locking system further including a bus node for coupling the at least one switching signal for activating the operating unit and means connecting the sensor to the bus node.

8. The locking system according to claim 7, wherein the connecting means includes another light guide coupling the sensor to the bus node.

9. The locking system according to claim 4, wherein, with the operating key inserted in the operating key receptacle, permanent data transmission between the operating key receptacle and the operating key takes place while the operating unit is in operation, and the first data memory in the operating key stores data generated during operation of the operating unit.

10. The locking system according to claim 1, wherein the operating key receptacle comprises an ignition lock of the automobile into which the operating key is inserted, and the operating unit comprises one of engine electronics of the automobile and an immobilizer.

11. The locking system according to claim 1, wherein the operating key receptacle comprises an ignition lock including a rotatably arranged plug socket for receiving the operating key; the light guide comprises a light guide rod arranged on the plug socket in the operating key receptacle so that when the operating key is inserted into the operating key receptacle, one end of the light guide rod makes an optical coupling with the electro-optical convertor elements in the operating key, and another end of the light guide rod is optically coupled to corresponding electro-optical convertor elements mounted in the operating key receptacle.

12. The locking system according to claim 11, wherein the operating key receptacle further includes: a rotary sleeve elastically coupled to the plug socket for rotational movement; a blocking device lockingly engaged with the rotary sleeve and being responsive to a successful transmission of the operating signals between the operating key and the operating key receptacle for unlocking the blocking device to allow rotational movement of the rotary sleeve; and a switching device for generating switching signals in dependence on a rotary position of the rotary sleeve, at least one of the switching signals being for activating the operating unit.

13. The locking system according to claim 12, and further including a bus node for coupling the at least one switching signal for activating the operating unit.

14. The locking system according to claim 13, wherein the bus node comprises a CAN node.

15. The locking system according to claim 1, wherein the operating key includes a swing-out mechanical key for emergency opening of at least one mechanical door lock of a door of the automobile.

16. The locking system according to claim 1, wherein insertion of the operating key in the operating key receptacle switches on a transmission of the optical energy signal.

* * * * *